(12) United States Patent
Piccolo, III (10) Patent No.: US 9,293,031 B2
(45) Date of Patent: Mar. 22, 2016

(54) SYSTEM AND METHOD FOR USING CUSTOMER DATA NETWORKS FOR ALARM SYSTEMS

(71) Applicant: SimplexGrinnell LP, Westminster, MA (US)

(72) Inventor: Joseph Piccolo, III, Fitzwilliam, NH (US)

(73) Assignee: TYCO FIRE & SECURITY GMBH, Neuhausen Am Rheinfall (CH)

( * ) Notice: Subject to any disclaimer, the term of this patent is extended or adjusted under 35 U.S.C. 154(b) by 237 days.

(21) Appl. No.: 13/889,448

(22) Filed: May 8, 2013

(65) Prior Publication Data

US 2014/0333430 A1    Nov. 13, 2014

(51) Int. Cl.
| | |
|---|---|
| G08B 29/00 | (2006.01) |
| G08B 29/16 | (2006.01) |
| G08B 25/00 | (2006.01) |
| H04L 12/46 | (2006.01) |
| H04L 1/00 | (2006.01) |

(52) U.S. Cl.
CPC .............. *G08B 29/16* (2013.01); *G08B 25/004* (2013.01); *H04L 1/00* (2013.01); *H04L 12/46* (2013.01)

(58) Field of Classification Search
CPC ................................. H04L 1/00; H04L 12/46
USPC .......................... 340/508; 709/224, 225, 229
See application file for complete search history.

(56) References Cited

U.S. PATENT DOCUMENTS

| | | | | |
|---|---|---|---|---|
| 2002/0073333 | A1* | 6/2002 | Palka et al. | 713/201 |
| 2004/0260812 | A1* | 12/2004 | Rhodes et al. | 709/225 |
| 2011/0032095 | A1* | 2/2011 | Hicks, III | 340/516 |
| 2012/0311148 | A1* | 12/2012 | Gerlach et al. | 709/224 |

* cited by examiner

*Primary Examiner* — Shirley Lu
(74) *Attorney, Agent, or Firm* — Kacvinsky Daisak Bluni PLLC (57) ABSTRACT

An alarm system is disclosed for transmitting data over a data network at a monitored site. The alarm system may include at least two alarm panels operatively connected to the data network and connected to one another by an alternate data path. The alarm panels may be configured to communicate with one another via the data network if the data network is able to facilitate such communication. The alarm panels may further be configured to communicate with one another via the alternate data path if the data network is not able to facilitate such communication. A method of operating the disclosed system is also disclosed.

20 Claims, 6 Drawing Sheets

SYSTEM AND METHOD FOR USING CUSTOMER DATA NETWORKS FOR ALARM SYSTEMS

FIELD OF THE DISCLOSURE

The disclosure relates generally to the field of alarm systems, and more particularly to a system and method for using customer data networks to enable communication between components in alarm systems.

BACKGROUND OF THE DISCLOSURE

Alarm systems, such as fire alarm and security systems, typically include one or more alarm panels that receive information from various sensors that are distributed throughout a monitored structure or area. For example, a typical fire alarm system may include several alarm panels that are installed at various locations throughout a building and that are connected to one another via a data network. Each alarm panel may be operatively connected to a plurality of initiating devices (e.g., smoke detectors, manually-actuated pull stations, etc.) that are distributed throughout respective areas of the building.

During normal operation of the alarm system, the alarm panels may monitor electrical signals associated with each of the respective initiating devices connected thereto for variations that may represent the occurrence of an alarm condition. For example, a variation in a particular electrical signal may represent the detection of smoke by a smoke detector in a corresponding area of the building in which the smoke detector is located, and may cause the alarm panel to enter an alarm mode. The alarm panel may be configured to respond to such a condition by initiating certain predefined actions, such as communicating the alarm condition to other alarm panels in the building and activating one or more notification appliances (e.g. strobes, sirens, public announcement systems, etc.) within the building.

A first shortcoming associated with traditional alarm systems of the type described above is that they typically require the installation of a dedicated data network within a monitored building to facilitate communication between alarm panels. Such installations are generally very expensive and require significant maintenance and supervision. A more convenient and less expensive solution is to connect alarm panels to one another via a building's existing data network, such as an Internet protocol (IP) compatible data network within a building that is used primarily for connecting business and/or personal computers to one another and to the Internet. However, such networks are generally not robust or reliable enough to meet government issued safety guidelines (e.g., fire codes) that establish minimum requirements for connection supervision, redundancy, battery backup capability, etc., which are of particular importance within the context of fire alarm system applications.

SUMMARY

In view of the foregoing, it would be advantageous to provide means for utilizing a building's existing data network to facilitate the interconnection of alarm panels in an alarm system, wherein such means meet or exceed government issued safety guidelines.

An exemplary embodiment of an alarm system in accordance with the present disclosure may include at least two alarm panels operatively connected to a data network at a monitored site and connected to one another by an alternate data path that is independent from the data network. The alarm panels may be configured to communicate with one another via the data network if the data network is able to facilitate such communication. The alarm panels may be further configured to communicate with one another via the alternate data path if the data network is not able to facilitate such communication. One or more of the alarm panels may monitor the connectivity of the data network, such as by performing intermittent, end-to-end pinging via the data network, in order to determine whether the data network is able to facilitate communication between the alarm panels.

An exemplary method in accordance with the present disclosure may include the steps of transmitting alarm system data between at least two alarm panels via a data network at a monitored site if the data network is able to facilitate such transmissions, and transmitting the alarm system data between the alarm panels via an alternate data path if the data network is not able to facilitate such transmissions. The method may further include the step of monitoring connectivity between the alarm panels via the data network, wherein such monitoring may include at least of the alarm panels performing intermittent, end-to-end pinging via the data network.

BRIEF DESCRIPTION OF THE DRAWINGS

By way of example, specific embodiments of the disclosed device will now be described, with reference to the accompanying drawings, in which.

DETAILED DESCRIPTION

A system and method for implementing an alarm system using a building's existing data network will now be described more fully hereinafter with reference to the accompanying drawings, in which preferred embodiments of the invention are shown. This disclosed system and method, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

It will be appreciated by those of ordinary skill in the art that the system and method described herein may be implemented in virtually any type of alarm or monitoring system, including, but not limited to, fire alarm systems, burglar alarm systems, surveillance systems, air quality monitoring systems, inventory monitoring systems, etc., or any combination thereof, such as may be provided for detecting an alarm event (e.g. a security breach) or a warning condition (e.g. an elevated temperature) in a building, structure, enclosure, or area. Many other applications are contemplated and may be implemented without departing from the scope of the present disclosure. All such applications are collectively referred to herein as "alarm systems."

Figure 1:
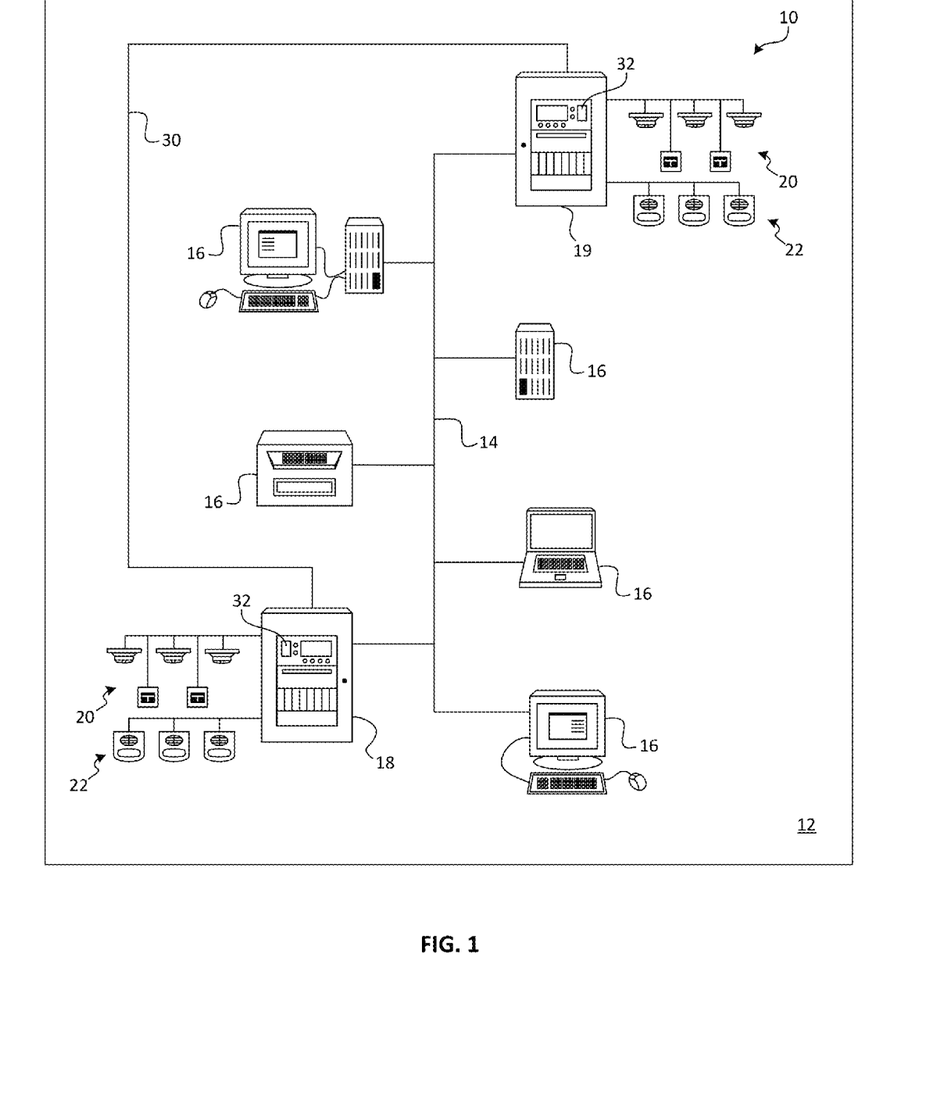
FIG. 1 is a schematic diagram illustrating an exemplary alarm system in accordance with an embodiment of the present disclosure.

An exemplary alarm system 10 in accordance with the present disclosure is depicted in FIG. 1. The alarm system 10 may be installed at a monitored site 12, such as a building, school, residence, campus, or any other type of facility or area. The monitored site 12 may include a data network 14 installed therein, such as may be provided for interconnecting and facilitating data transmission between various electronic devices 16 at the monitored site 12. Such electronic devices may include, but are not limited to, laptop computers, desktop computers, tablet computers, servers, telephones, personal data assistants (PDAs), various peripheral devices, and the like, wherein such devices do not normally include the components of an alarm system. The term "data network" as used herein is thus defined to mean a network that is not normally used to interconnect components of an alarm system.

The data network 14 may be implemented using any wired or wireless network connection technology suitable for directly or indirectly connecting the electronic devices 16 to one another and/or to the Internet, including, but not limited to, dial-up, Ethernet, token ring, wireless cellular data networks, etc. It is contemplated that the data network 14 may in some embodiments of the present disclosure provide a secure connection, such as may be achieved through the implementation of a virtual private network (VPN) or other secure network connection technology.

The alarm system 10 may include alarm panels 18 and 19. Only two alarm panels 18 and 19 are shown in FIG. 1, but it will be understood that a greater number of alarm panels may be similarly implemented without departing from the scope of the present disclosure. Each alarm panel 18 and 19 may be operatively connected to one or more initiating devices 20, such as smoke detectors, heat detectors, manually-actuated pull stations, etc., as well as one or more notification appliances 22, such as strobes, sirens, public announcement systems, etc., that are distributed throughout the monitored site 12.

During normal operation of the alarm system 10, one or more of the initiating devices 20 may be manually or automatically activated upon the occurrence of a hazardous condition (e.g., a fire) within the monitored structure 12. Such actuation may result in the activation of one or more of the notification appliances 22, thereby providing occupants of the monitored site 12 with visual and/or auditory warnings relating to the hazardous condition. Actuation of the initiating devices 22 may further cause the alarm system 10 to perform a variety of additional actions as further described below.

Each of the alarm panels 18 and 19 may be adapted for operative connection to the data network 14. For example, if the data network 14 is an Ethernet network, each of the alarm panels 18 and 19 may be provided with an Ethernet port and may be configured to send and receive data via such ports. The alarm panels 18 and 19 may be similarly adapted for connection to dial-up, token ring, or other types of data networks as may be dictated by the particular network infrastructure in the monitored site 12. It is contemplated that each of the alarm panels 18 and 19 may be adapted for connection to only the specific type of data network in the monitored site 12 (i.e., tailored for a specific application). Alternatively, it is contemplated that each of the alarm panels 18 and 19 may be configured for connection to a variety of different types of data networks (i.e., suitable for impletion in several different applications), including the type of data network in the monitored site 12. For example, each of the alarm panels 18 and 19 may be provided with an Ethernet port, a dial-up port, a Token-Ring port, etc., only one of which may be used for connection to the particular data network 14 in the monitored site 12 as further described below.

The alarm panels 18 and 19 may be connected to the data network 14 at various points therein, as shown in FIG. 1. Connected thusly, the alarm panels 18 and 19 may be placed in communication with one another, as illustrated by the dashed line shown in FIG. 2. Particularly, the alarm panels 18 and 19 may send and receive various data, including, but not limited to, data relating to the operational status of the initiating devices 20 and notification appliances 22. For example, if one of the initiating devices 20 connected to the alarm panel 18 is actuated, such as upon the occurrence of a hazardous condition in the monitored site 12, the alarm panel 18 may, in addition to entering an alarm mode and activating the notification appliances 22 connected directly thereto, transmit an alarm signal to the alarm panel 19 via the data network 14. The alarm signal may cause the alarm panel 19 to also enter an alarm mode and to activate the notification appliances 22 connected directly thereto, thus notifying occupants in all areas of the monitored site 12 of the detected hazardous condition. The data network 14 thereby allows the alarm panels 18 and 19 to exercise control over one another in a predefined manner.

Figure 2:
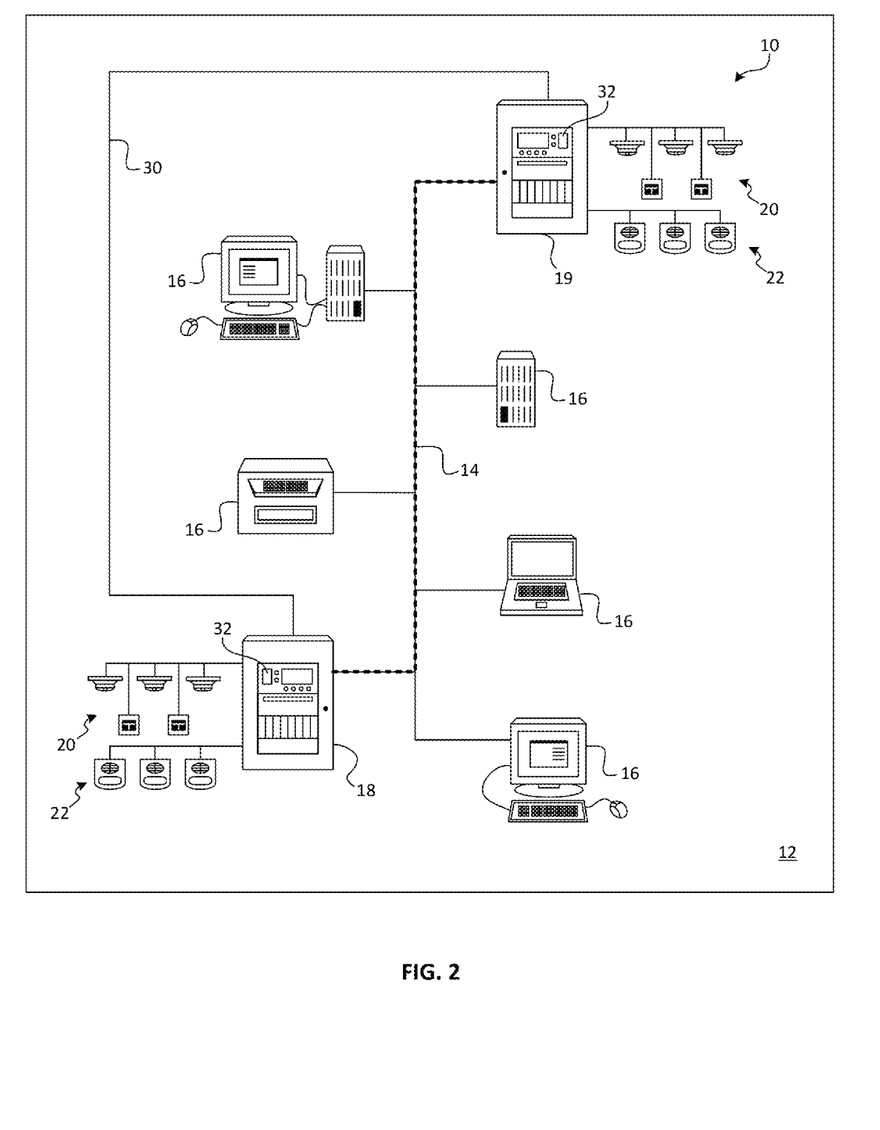
FIG. 2 is a schematic diagram illustrating the alarm system of FIG. 1 and highlighting a data network connection between alarm panels of the alarm system.

The data network 14 may also facilitate numerous supervisory functions of the alarm panels 14. For example, if one or more of the initiating devices 20 connected to the alarm panel 18 is actuated, such as upon the occurrence of a hazardous condition in the monitored site 12, unique addresses associated with each of the actuated initiation devices 20 connected thereto may be transmitted to the alarm panel 19. Thus, by consulting a user interface of the alarm panel 19, response personal (e.g., firefighters, police, emergency medical technicians, etc.) may identify which initiating devices 20 in the alarm system 10 were activated and may thereby localize the source of the hazardous condition.

As will be appreciated by those of ordinary skill in the art, many other supervisory and control functions of the alarm system 10 may be facilitated by communication between the alarm panels 18 and 19 via the data network 14. All such functions are contemplated and may be implemented without departing from the scope of the present disclosure.

Figure 6:
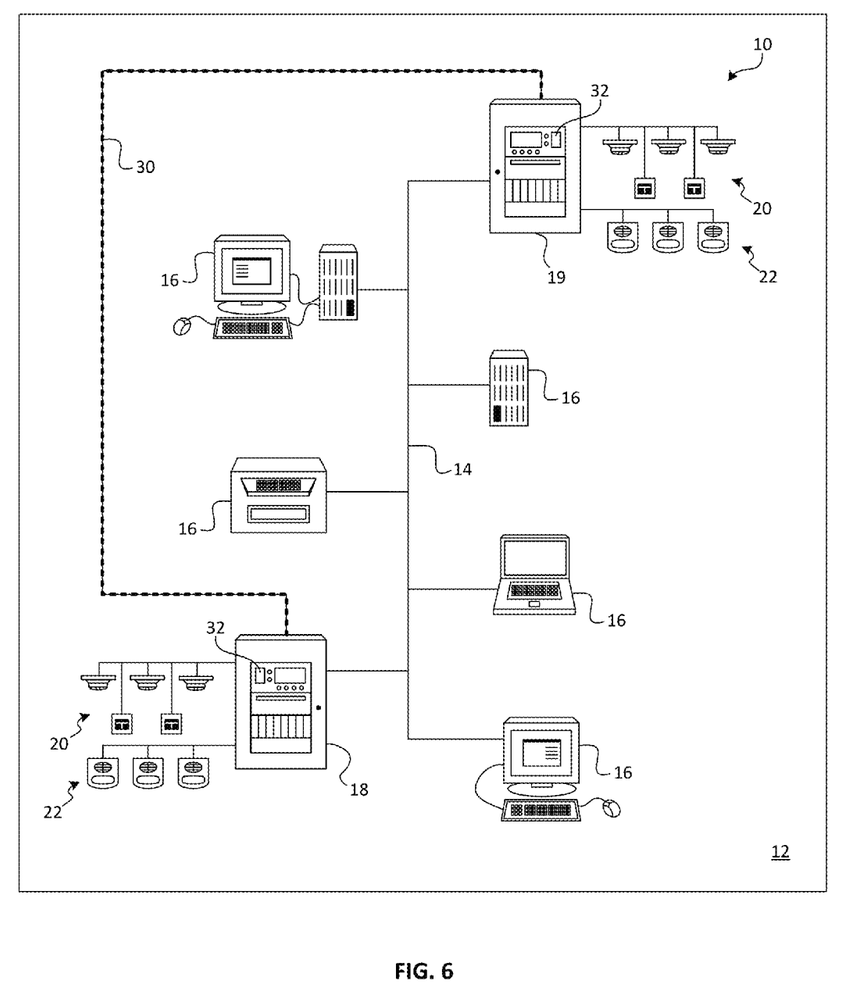
FIG. 6 is a schematic diagram illustrating the alarm system of FIG. 1 and highlighting an alternate data path connection between alarm panels of the alarm system.

In addition to being connected to one another via the data network 14 of the monitored site 12, the alarm panels 18 and 19 of the alarm system 10 may be connected to one another via an alternate data path 30. The alternate data path 30 may be entirely independent from the data network 14, and may be facilitated by network connection technologies that are the same type as, or that are entirely different from, the network connection technology that facilitates the data network 14. For example, the alternate data path 30 may be implemented using various wired or wireless data connection technologies, including, but not limited to, Ethernet, Token-Ring, dial-up, cellular, Bluetooth, Wi-Fi, etc. The alternate data path 30 is shown in the figures as a solid line, but it will be understood that this may represent both wired and wireless modes of connection. In one non-limiting embodiment, the alternate data path 30 may be facilitated by a wireless connection enabled by IP communicator wireless modules 32 residing within each of the alarm panels 18 and 19. Such modules 32 may be listed for fire alarm applications pursuant to guidelines issued by Underwriters Laboratories (UL), for example.

Figure 3:
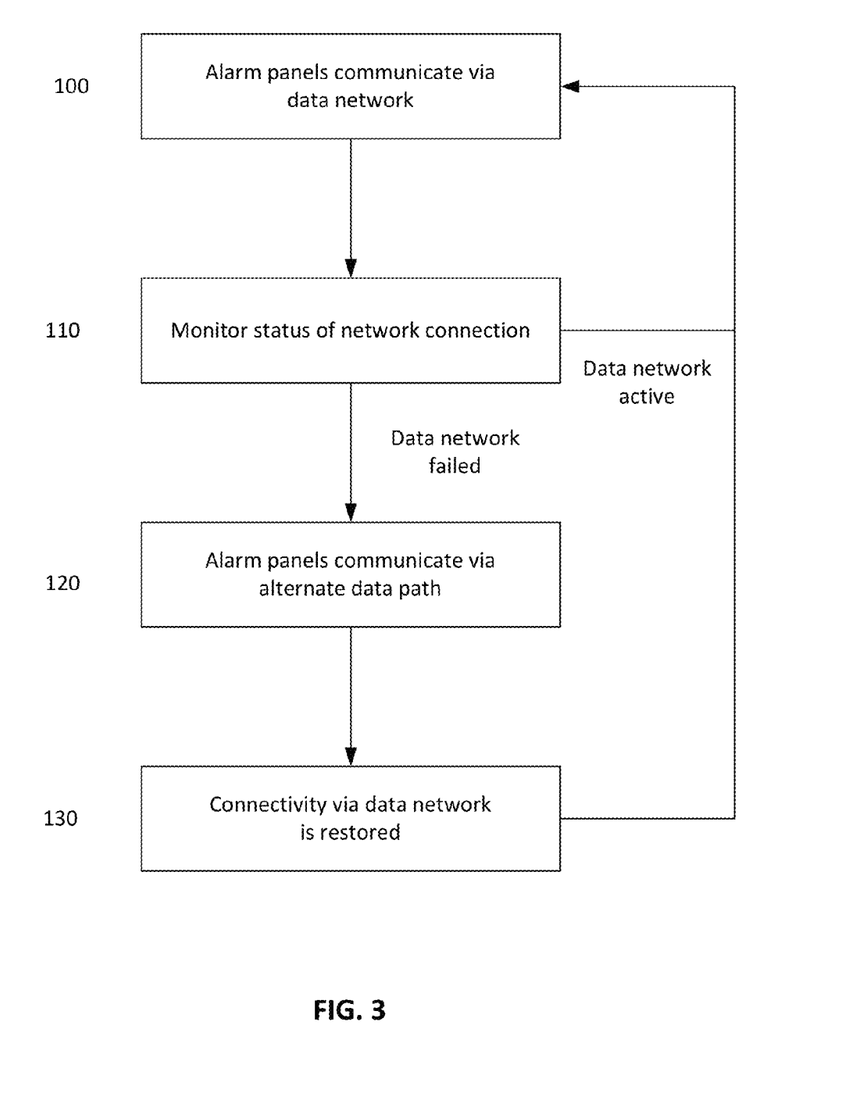
FIG. 3 is a flow diagram illustrating an exemplary method in accordance with the present disclosure.
Figure 4:
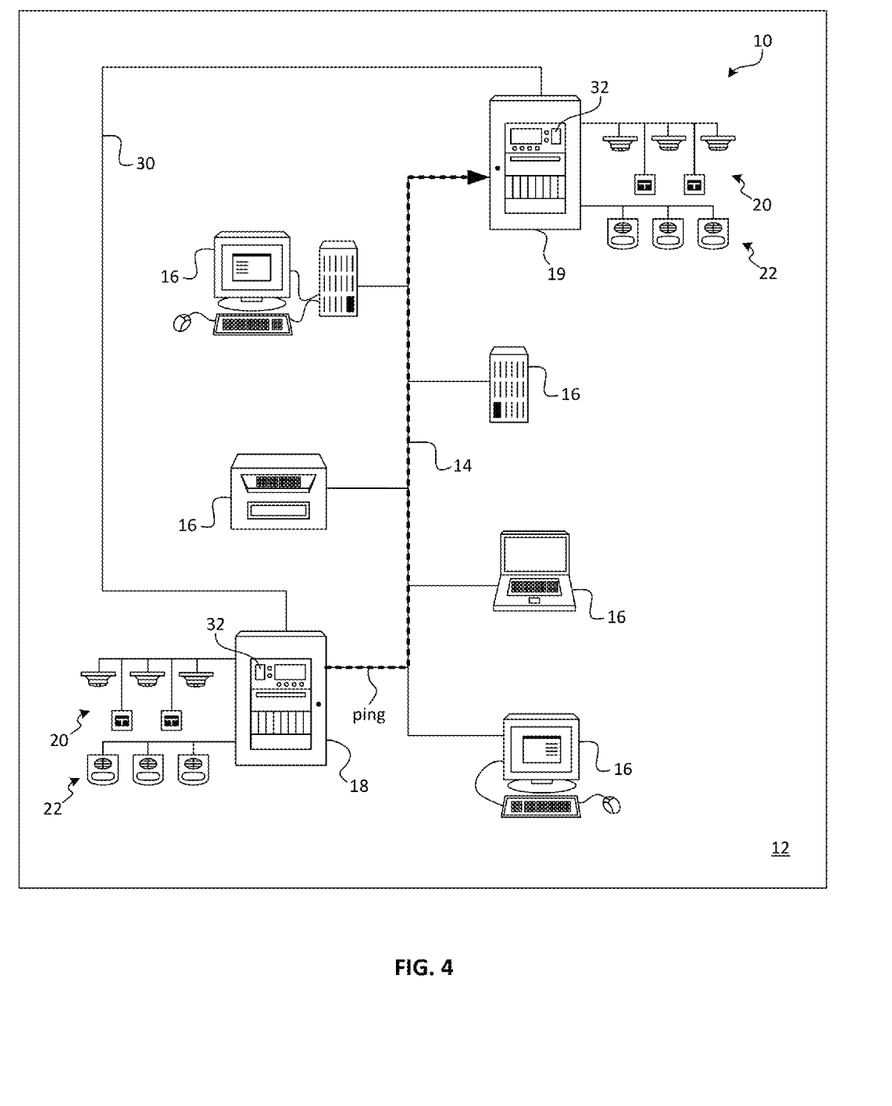
FIG. 4 is a schematic diagram illustrating the alarm system of FIG. 1 and highlighting a network ping being transmitted from one alarm panel to another alarm panel.
Figure 5:
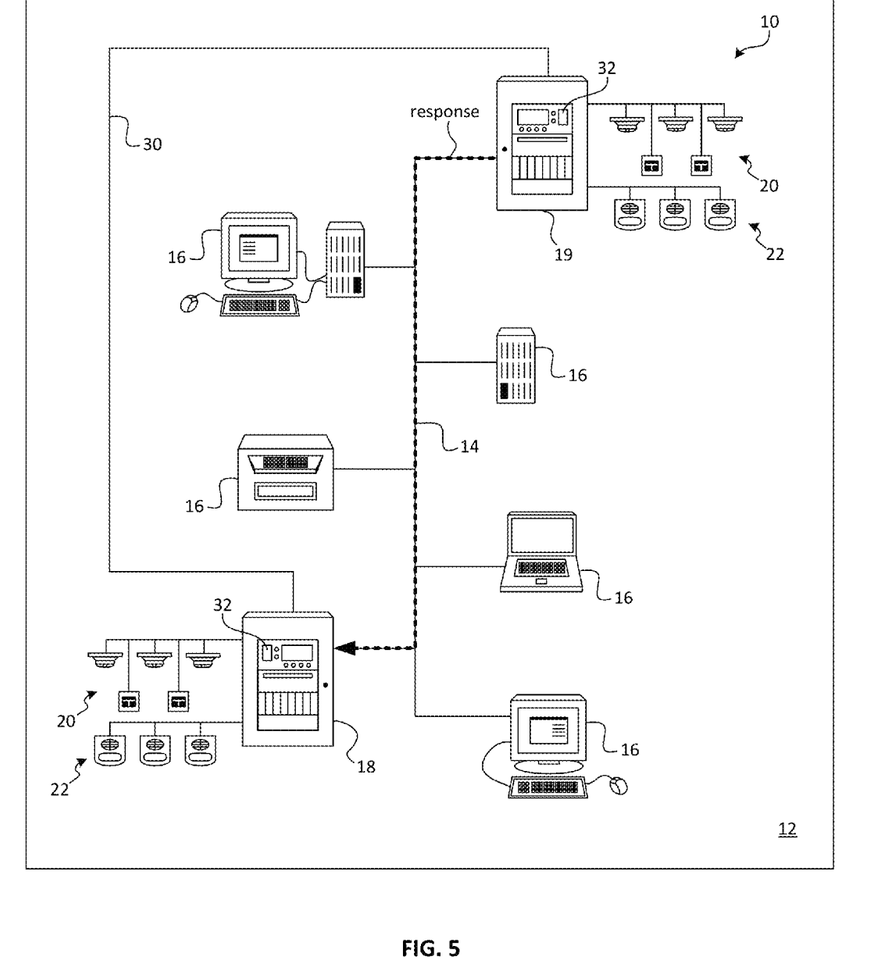
FIG. 5 is a schematic diagram illustrating the alarm system of FIG. 1 and highlighting a response to a network ping being transmitted from one alarm panel to another alarm panel.

Referring to FIG. 3, a flow diagram illustrating an exemplary method for operating the alarm system 10 in accordance with the present disclosure is shown. The method will now be described in detail in conjunction with the schematic representations of the alarm system 10 shown in FIGS. 1, and 4-6.

At step 100 of the exemplary method, the alarm panels 18 and 19 may, during normal operation of the alarm system 10, be configured to communicate with one another via the data network 14 in the manner described above for sending and receiving data pertaining to the operation of the alarm system 10 as desired. At various times during operation of the alarm system 10, one or both of the alarm panels 18 and 19 may, at step 110 of the exemplary method, monitor the data network connection in order to verify that the data network 14 is functioning properly and is able to facilitate communication between the alarm panels 18 and 19 should active communication become necessary. For example, the alarm panels 18 and 19 may perform "end-to-end pinging," whereby data packets are intermittently sent back and forth between the alarm panels 18 and 19 to verify connectivity via the data network 14. Particularly, the alarm panel 18 may transmit a data packet to the other alarm panel 19 as indicated by the dashed line shown in FIG. 4, and may expect to receive a response (e.g., a data packet issued by the alarm panel 19) within a predetermined amount of time t. If a response is received within the expected time period t, as indicated by the dashed line shown in FIG. 5, the alarm panel 18 may determine that the data network 14 is functioning properly and the alarm panels 18 and 19 may continue to communicate via the data network 14. However, if the alarm panel 18 does not receive a response within the expected time period t, the alarm panel 18 may determine that the network connection has failed. It is contemplated that the alarm panel 18 may attempt to ping the alarm panel 19 several times without response before determining that the network connection has failed.

It is contemplated that various methods for verifying connectivity over the data network 14 other than end-to-end pinging may additionally or alternatively be implemented in the alarm system 10. For example, such verification techniques may include, but are not limited to, sending data packets and "ack/nak" (acknowledged and not acknowledged) messages, time sync messages, broadcast periodic polling, end node sequence updating, etc.

If it is determined at step 110 of the method that the data network 14 has failed and is not able to transmit data between the alarm panels 18 and 19, the alarm panels 18 and 19 may, at step 120 of the exemplary method, cease attempting to communicate via the data network 14 and may switch to communicating via the alternate data path 30, as indicated by the dashed line shown in FIG. 6. For example, the alarm panels 18 and 19 may activate their respective wireless modules 32 (described above) and establish active communication with each other therethrough if and when such active communication becomes necessary, such as upon the occurrence of a hazardous condition within the monitored structure 12. Such switchover may be performed in a seamless manner without any disruption at the alarm panel 19.

The alarm panels 18 and 19 may continue to use the alternate data path 30 for data transmission there between until, at step 130 of the exemplary method (see FIG. 3), connectivity via data network 14 is restored. For example, a technician may repair the data network 14 and may "reset" the alarm panels' connection thereto, such as by selecting an appropriate reset option using hard or soft input means at one or both of the alarm panels 18 and 19. The alarm panels 18 and 19 may then seamlessly resume communicating and monitoring connectivity over the data network 14 as described above.

The alternate data path 30, as well as the method of monitoring the state of the connection provided by the data network 14, thus provide the alarm system 10 with a redundant data transmission path that may effectively preserve connectivity between the alarm panels 18 and 19 even if the data network 14 completely fails. This is because the alternate data path 30 is entirely separate from the data network 14 and is therefore not subject to the same failure modes as that data network 14. The robustness and monitoring capability provided by the disclosed alarm system 10 and corresponding method may meet and/or exceed government issued standards dictating minimum requirements for such attributes. Moreover, the alarm system 10 may be implemented at a much lower cost than traditional alarm systems which require the installation of a dedicated alarm system data network. This is because the alarm system 10 utilizes the data network 14 at a very low cost during normal operation (i.e., the majority of the time) and utilizes the higher cost, alternate data path 30 very rarely, if ever.

It is contemplated that the alarm system 10 may be installed in a monitored structure at the same time as the data network 14. Alternatively, it is contemplated that the alarm system 10 may be conveniently installed in a monitored structure at any time after installation of the data network 14 in a retrofit manner, such as by connecting the alarm panels 18 and 19 of the alarm system 10 to access points (e.g., servers, routers, switches, hubs, etc.) throughout an existing data network 14. Still further, it is contemplated that the alarm system 10 may be installed in a monitored structure before the data network 14 in installed, and that the alternate data path 30 may be used to provide connectivity until the data network 14 is installed (e.g., after the structure has been granted an occupancy permit).

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

The various embodiments or components described above may be implemented as part of one or more computer systems. Such a computer system may include a computer, an input device, a display unit and an interface, for example, for accessing the Internet. The computer may include a microprocessor. The microprocessor may be connected to a communication bus. The computer may also include memories. The memories may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISCs), application specific integrated circuits (ASICs), logic circuits, and any other circuit or processor capable of executing the functions described herein. The above examples are exemplary only, and are thus not intended to limit in any way the definition and/or meaning of the term "computer."

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the term "software" includes any computer program stored in memory for execution by a computer, such memory including RAM memory, ROM memory, EPROM memory, EEPROM memory, and non-volatile RAM (NVRAM) memory. The above memory types are exemplary only, and are thus not limiting as to the types of memory usable for storage of a computer program.

The invention claimed is:

1. An alarm system configured to transmit data over a data network at a monitored site, the data network interconnecting and facilitating communication between a plurality of electronic devices that are not components of the alarm system, the alarm system comprising:
    at least two alarm panels operatively connected to one another via the data network, the alarm panels further connected to one another by an alternate data path,
    wherein the alarm panels are configured to communicate with one another via the data network when the data network is capable of facilitating such communication, and
    wherein the alarm panels are configured to communicate with one another via the alternate data path when the data network is not capable of facilitating such communication.

2. The alarm system of claim 1, wherein the alternate data path comprises a data connection selected from the group consisting of an Ethernet connection, a Token Ring connection, a dial-up connection, a cellular connection, a Bluetooth connection, and a Wi-Fi connection.

3. The alarm system of claim 1, wherein the alternate data path is independent from the data network.

4. The alarm system of claim 1, wherein the alternate data path includes IP wireless communicator modules associated with each of the alarm panels.

5. The alarm system of claim 1, wherein at least one of the alarm panels is configured to intermittently verify connectivity between the first and second panels via the data network.

6. The alarm system of claim 5, wherein the one or more of the alarm panels is configured to perform end-to-end pinging to verify connectivity via the data network.

7. The alarm system of claim 1, further comprising at least one initiating device connected to at least one of the alarm panels.

8. The alarm system of claim 1, further comprising at least one notification appliance connected to at least one of the alarm panels.

9. A method for transmitting alarm system data over a data network at a monitored site, the data network interconnecting and facilitating communication between a plurality of electronic devices that are not components of an alarm system, the method comprising:
    transmitting the alarm system data between at least two alarm panels in the alarm system via the data network when the data network is capable of facilitating such transmissions; and
    transmitting the alarm system data between the alarm panels via an alternate data path when the data network is not capable of facilitating such transmissions.

10. The method of claim 9, further comprising monitoring connectivity between the alarm panels via the data network.

11. The method of claim 10, further wherein the step of monitoring connectivity between the alarm panels via the data network comprises at least one of the alarm panels performing end-to-end pinging.

12. The method of claim 11, wherein the end-to-end pinging is performed intermittently.

13. The method of claim 11, wherein the end-to-end pinging comprises one of the alarm panels transmitting a data packet to another of the alarm panels via the data network and waiting a predetermined amount of time to receive a response.

14. The method of claim 13, further comprising determining that the data network is able to facilitate data transmission between the alarm panels if the alarm panel that transmitted the data packet receives a response within the predetermined amount of time.

15. The method of claim 13, further comprising determining that the data network is not able to facilitate data transmission between the alarm panels if the alarm panel that transmitted the data packet does not receive a response within the predetermined amount of time.

16. The method of claim 9, wherein the step of transmitting the alarm system data between the alarm panels via the alternate data path if the data network is not capable of facilitating such transmissions further comprises ceasing the transmission of the alarm system data via the data network.

17. The method of claim 9, wherein the step of transmitting the alarm system data between the alarm panels via the alternate data path further comprises restoring connectivity between the alarm panels via the data network and resuming transmission of the alarm system data via the data network.

18. The method of claim 9, wherein the alarm system data comprises information pertaining to at least one initiating device connected to one of the alarm panels.

19. The method of claim 9, wherein the alarm system data comprises information pertaining to at least one notification appliance connected to one of the alarm panels.

20. The method of claim 9, wherein the alarm system data comprises information pertaining to an alarm state of one of the alarm panels.

* * * * *